United States Patent
Solterbeck

(10) Patent No.: US 6,647,911 B1
(45) Date of Patent: Nov. 18, 2003

(54) TEMPORARY BOAT DOCK LATCH

(76) Inventor: Norman W. Solterbeck, 810 NW. 14th Ave., Payette, ID (US) 83661

( * ) Notice: Subject to any disclaimer, the term of this patent is extended or adjusted under 35 U.S.C. 154(b) by 0 days.

(21) Appl. No.: 10/211,511

(22) Filed: Aug. 5, 2002

(51) Int. Cl.⁷ .............................................. B63B 21/04
(52) U.S. Cl. ............................. 114/230.26; 114/230.29
(58) Field of Search ............................ 114/230.1, 230.2, 114/230.26, 230.29, 218; 410/10, 11, 104, 105, 112–116

(56) References Cited

U.S. PATENT DOCUMENTS

| | | | |
|---|---|---|---|
| 3,381,925 A | * 5/1968 | Higuchi | 410/116 |
| 3,703,875 A | * 11/1972 | Gunvalson | 114/230.29 |
| 4,297,963 A | 11/1981 | Beacom | 114/230 |
| 4,899,680 A | * 2/1990 | Russell, Jr. | 114/230.29 |
| 5,467,617 A | 11/1995 | Huebner | 70/18 |
| 5,575,234 A | 11/1996 | Dysarz | 114/230 |
| 5,690,042 A | 11/1997 | Bentley | 114/230 |
| 5,941,191 A | 8/1999 | Dysarz | 114/218 |

* cited by examiner

*Primary Examiner*—Sherman Basinger
(74) *Attorney, Agent, or Firm*—Frank J. Dykas; Robert L. Shaver; Stephen M. Nipper

(57) ABSTRACT

A temporary boat latch for use on a surface having spaced boards. The latch having a rod connecting a first crossbar having a length greater than the distance between the spaced boards and a width less than the distance between the spaced boards to an attachment device. A slideable connection sleeve, which has a generally perpendicularly connected second crossbar configured to fit over the spaced boards. In use, the first crossbar is inserted between the spaced boards and is oriented so that the crossbar cannot be withdrawn from between the boards by pulling the device upward. The sleeve is then lowered into the space between the boards so that a portion of the sliding means attaches to the boards and prevents the securing device from falling through the space between the boards.

11 Claims, 3 Drawing Sheets

TEMPORARY BOAT DOCK LATCH

BACKGROUND OF THE INVENTION

1. Field of the Invention

The present invention generally relates to boat docking attachment devices, and more particularly to a temporary, removable dock latch for use on having spaced decking.

2. Background Information

One of the necessary requirements for utilizing floating transportation on a body of water is securing the vehicle to a location to prevent drifting of the vehicle into another location. When an individual traveling by boat arrives at a destination or wishes to secure the boat to a fixed object, a variety of means may be employed. In some instanses, the boat may be beached upon the shore of the body of water. In other situations, the boat may be anchored in a desired location by lowering an anchor into the bed below the water. In many instances the boat is connected to a fixed object such as dock.

Some docks have cleats, which are configured to allow a line from a boat to be tied to them and thus tether the boat to the dock. Other docks have other connection means for attaching the boat to the dock. While these cleats and other means are useful in many respects, a variety of problems are also related to their use. First, the locations and spacing of the cleats may be in locations that are difficult or impossible to reach. Second, cleats may be broken or may have become detached from the dock. Third, in some situations, cleats are simply not located upon the docks or piers. When this occurs, the person utilizing the boat or other device must find another way of attaching their device to the dock or mooring.

Many types of permanent and semi-permanent structures are commonly found in marine environments. These include docks, piers, moorings and other objects. Many of these objects have a covering made of decking composed of materials such as wood, plastic or metal planks. These planks are spaced apart so as to allow water to drain from the surface into the body of water below. While these objects with spaced surfaces may be prevalent; they do not always provide an easy way for tethering connection between themselves and a boat or other device. Attempting to simply tie a tethering line to the planks may be difficult and even if achieved may provide a connection that is too slippery to be useful. Attaching devices to the docks with the use of screws, bolts, or other more permanent devices usually results in damage to the dock and would most likely require the use of tools.

Therefore, it is an object of this invention to provide a boat latch configured for connection with objects having spaced decking. Another object of this invention is to provide a removable latching device for use with objects having spaced decking whereby the latch can be attached and removed according to the needs and desires of the person utilizing the device. Another object of the invention is to provide a removable boat-latching device that can be alternatively attached and removed from a surface having spaced decking with the use of only one hand.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention is a temporary boat latch for use on a surface having spaced boards. The device is made up of a generally elongated rod having a first end generally perpendicularly connected to a first crossbar. The first crossbar is configured to have a length greater than the distance between the spaced boards and a width less than the distance between the spaced boards. A rod extends from the crossbar along a shaft to a U-shaped portion. The rod then extends consecutively from the U-shaped portion to a first curved portion, a second curved portion, a third curved portion, and then terminates at a second end. An attachment ring configured for attachment within the U-shaped portion of the rod circumvolves the U-shaped portion of the rod and is held in place by the first and second curved portions. The attachment ring is designed to connect with a tethering means.

A slideable connection sleeve is configured to fit over the rod second end and the rod shaft in a sliding engagement. This sleeve has a generally perpendicular second crossbar extending through it. The second crossbar is dimensioned to have a length greater than the distance between the spaced boards. The slideable connection sleeve is maintained in connection with the rod by a tapered portion near the bottom of the sleeve. This tapered portion also allows the sliding portion to be inserted between spaces that are too small for the remainder of the sleeve to be inserted and acts as a means for preventing the device from through the space.

In use, the first perpendicular crossbar is inserted between the spaced boards and is oriented so that the crossbar cannot be withdrawn from between the boards by pulling the device upward. The U-shaped rod is raised up so that the first crossbar is engaged with the bottom side of the boards. The sleeve is then lowered into the space between the boards. If the space between the boards is sufficient, the sleeve will lower until the second crossbar rests upon the top surface of the boards. If the space is more narrow the sleeve will descend until it contacts the surface of the boards. This contact prevents the securing device from falling through the space between the boards.

The connection between the object to be secured and the securing device is provided by a connection with the attachment ring. When the user no longer wishes to remain in the same location, the device can be removed from between the boards. This is done by sliding the sleeve upward away from the first crossbar, rotating the device so that the first crossbar aligns within the space between the boards and removing the device from between the boards. This device provides a removable attachment means for use with a surface having spaced elements that does not require the use of tools and can be attached by using only one hand.

Still other objects and advantages of the present invention will become readily apparent to those skilled in this art from the following detailed description wherein I have shown and described only the preferred embodiment of the invention, simply by way of illustration of the best mode contemplated for carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
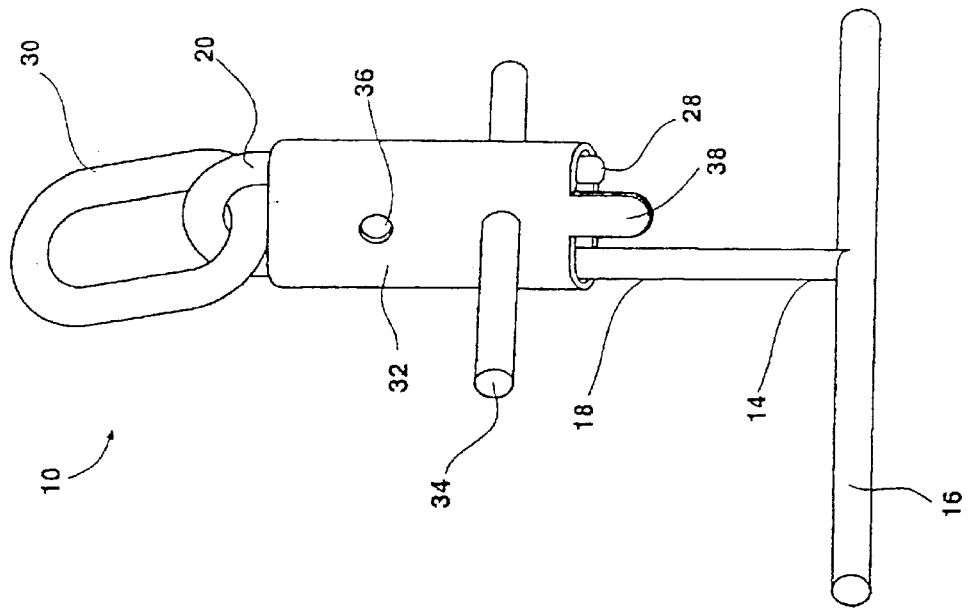
FIG. 1 is a perspective view of one embodiment of the invention in a first position.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIGS. 1–4 show a temporary boat latch for use on a surface having spaced elements. Referring first to FIG. 1, a perspective view of a first embodiment of the invention in a first position is shown. This invention 10 comprises an elongated rod 12 having a first end 14 generally perpendicularly connected to a first crossbar 16. The crossbar 16 is dimensioned to have a length greater than the distance between the spaced board members and a width less than the distance between the spaced board members (not shown). The rod 12 extends from the first crossbar 16 along a shaft (not shown) to a generally U-shaped rod portion 20. Within this rod portion 20, an attachment means 30 is shown.

In this embodiment, attachment means 30 is a generally oval shaped ring, which circumvolves the U-shaped portion of the rod 20. This attachment means 30 is held within this location by the rod 12 that may be bent into various configurations (not shown). While in this embodiment the attachment means 30 is a ring, it is to be distinctly understood that any means that provides a suitable attachment connection for tying a line from a watercraft thereto may be used. This includes, but is not limited to; embodiments where the boat is attached to the generally U-shaped portion 20 of the rod itself.

The rod extends from the generally U-shaped rod 20 to a first curved portion, a second curved portion and a third curved portion, as well as a rod second end. In this figure, these portions are all enclosed within a slideable sleeve 32. The slideable sleeve 32 is configured to receive the generally elongated rod 12 within and is further designed for sliding engagement from the first position shown in FIG. 1 to a second position shown in FIG. 2. The sliding sleeve 32 also has a second crossbar 34. The second crossbar 34 has a length greater than the distance between two spaced boards and is configured to hold the device 10 in a desired location between the spaced board members (not shown.) The second crossbar 34 may be made up of a single bar which passes through the sleeve 32 or it may be a combination of two pieces each connected to the sleeve 32. The sliding sleeve 32 also has hole 36, which passes through the sleeve 32 and allows for a retaining means such as a lock to be placed therein. This prevents the device 10 from being stolen or removed from its position upon a dock.

Figure 2:
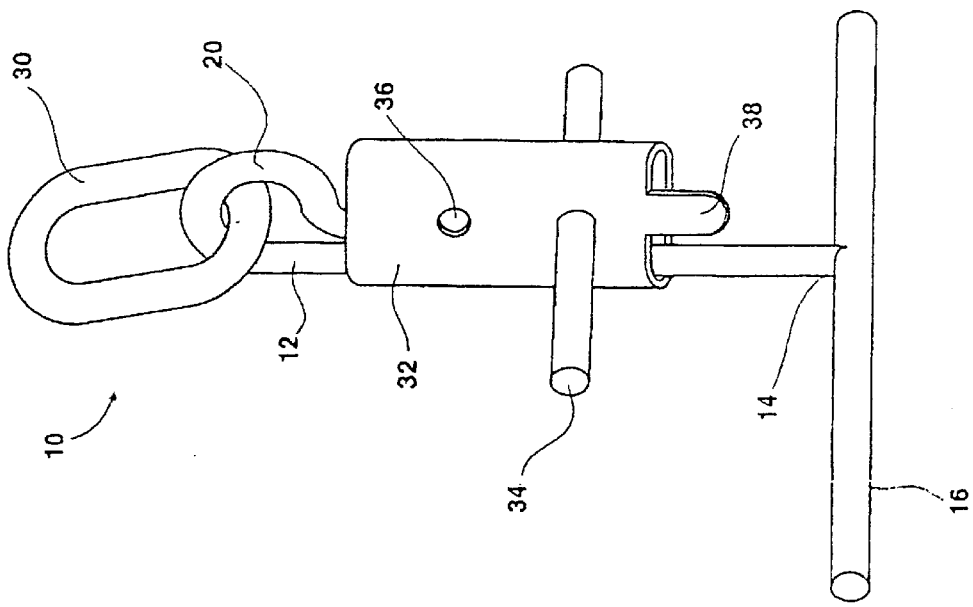
FIG. 2 is a perspective view of the embodiment of the invention shown in FIG. 1 in position.

Referring now to FIG. 2, the same embodiment of the invention shown in FIG. 1 is shown in a second position. In this second position, the slideable sleeve 32 is raised from its first position showing a portion of the shaft 18, as well as the second end 28 of the elongated rod 12.

Figure 3:
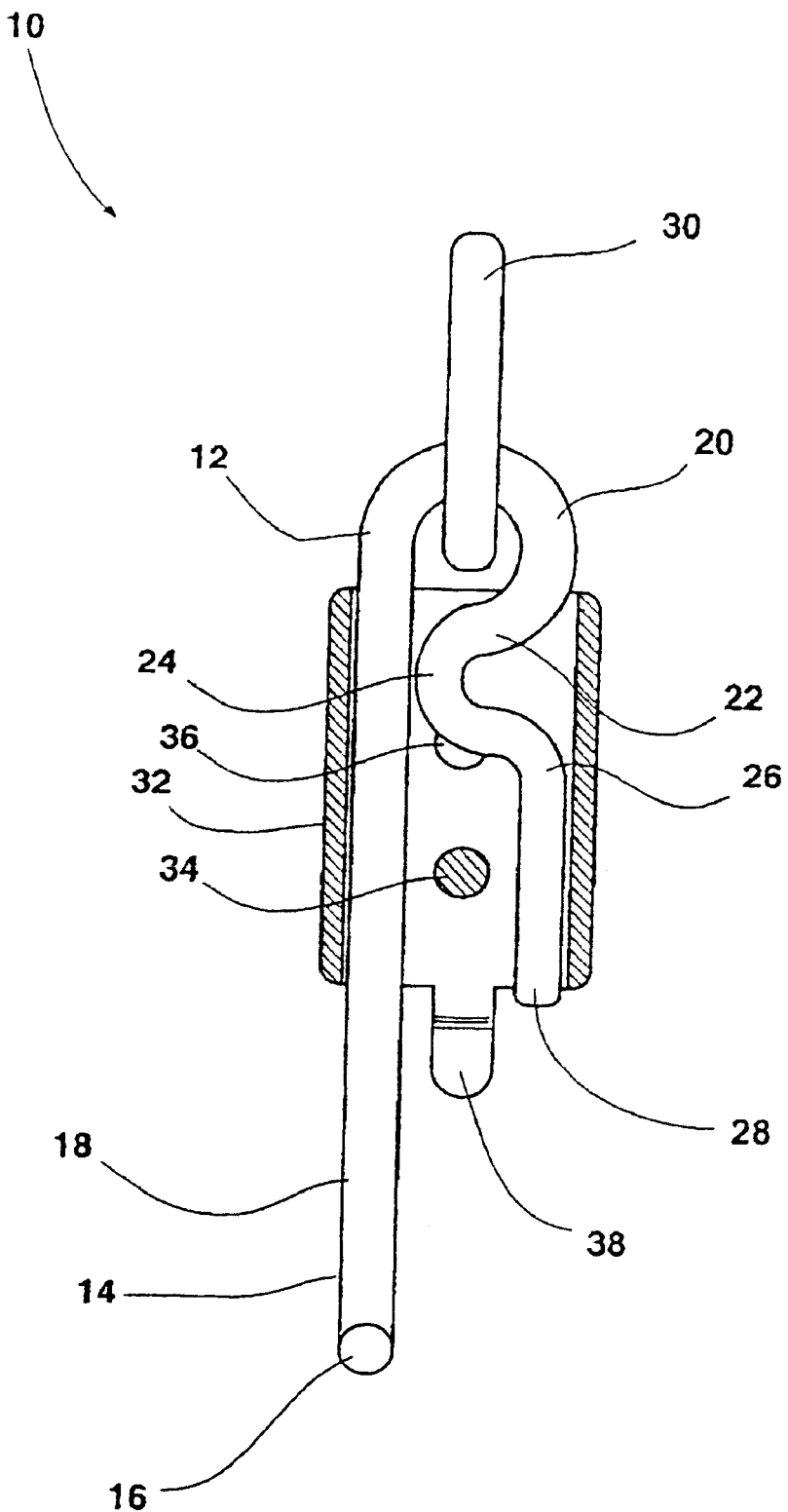
FIG. 3 is a detailed cutaway side view of the embodiment shown in FIGS. 1 and 2.

Referring now to FIG. 3, a detailed cutaway view of the embodiment of the invention shown in FIGS. 1 and 2 is shown. In this figure, the portions of the sleeve 32 are cutaway to show the portions of the rod 12, which are contained in a slideable engagement within the sleeve 32. The shaft portion 18 of the elongated rod 12 extends from the first end 14 to the generally U-shaped portion 20. From the generally U-shaped portion 20, the rod 12 extends to a first curved portion 22, a second curved portion 24 and a third curved portion 26. This combination of curved portions 22, 24, 26 assist to maintain the attachment ring 30 in a desired location within the U-shaped portion of the device 10.

The elongated rod 12 extends from the third curved portion 26 to a second end 28. The distance from the third curved portion 26 to the second end 28 and is configured to be sufficiently long so as to prevent the sleeve 32 from becoming disengaged with the second end 28 of the rod 12. In this embodiment, the distance between the first crossbar 16 and the second end 28 of the rod 12 is less than the length of the sleeve 32. This feature prevents movement of the sleeve off of the shaft 18 and the second end 28 of the rod 12 in a direction toward the first crossbar 16. When the sleeve 32 is moved in a downward direction, movement of the sleeve 32 will occur at a position where the sleeve 32 impacts the crossbar 16. At this location of impact, the sleeve 32 is still in a desired position about the shaft 18 and second end 28 of the rod 12. Movement of the sleeve off of the shaft 18 and second end 12 is also prevented by the second crossbar 34, which passes through the sleeve 32, and the tapereed portions 38 of the sleeve 32.

In the event that the device 10 needs to be attached within a space too small to allow the sleeve 32 to descend to a location wherein the second cross bar 34 contacts a top surface of the boards, the device can still be utilized to attach to a dock. The tapered portion 38 of the sleeve 32 can still be slipped into a desired position between the boards. This tapered portion 38 is held in place by the force of friction between the boards and the sleeve 32 or a rod or lock inserted through the padlock hole 36.

Figure 4:
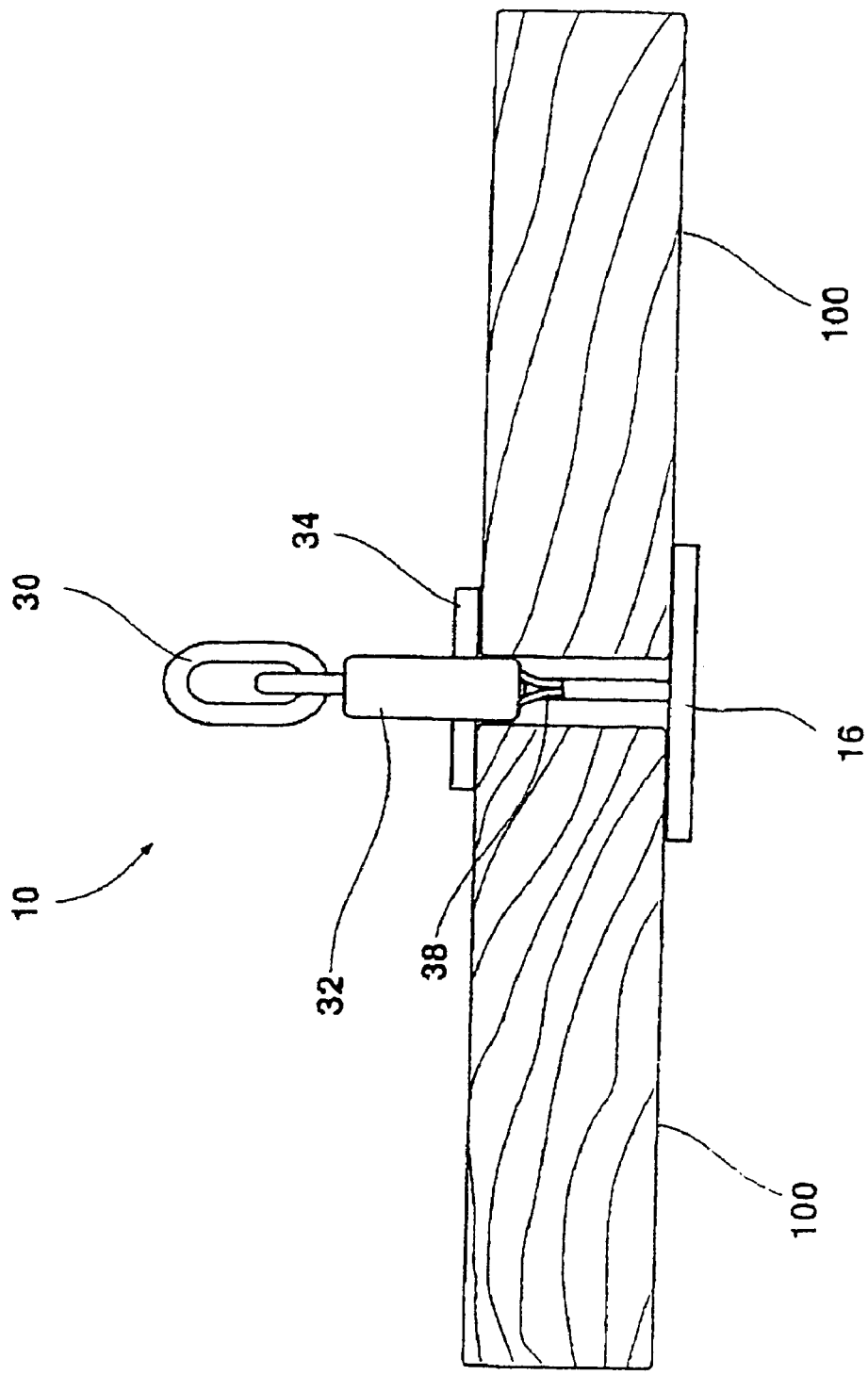
FIG. 4 is a front view of the embodiment shown in FIGS. 1, 2 and 3 in use on a surface having spaced elements.

Referring now to FIG. 4, a front view of the invention 10 is shown in use upon a surface made of spaced boards 100. In this figure, the first crossbar portion 16 has been inserted between the spaced boards 100 on the surface of the dock or pier. The device 10 has also been oriented so that the first crossbar portion 16 engages each of the boards 100 disposed on either side of the space. The sliding sleeve 32 has been raised to a position higher than the thickness of the boards 100, and then lowered into a second position between these boards. Depending upon the distance between the boards 100. Either the second crossbar 34 or a portion of the sleeve 32 will contact both of the boards 100 and will hold the sleeve 32 in place. In this lowered position, the device 10 is attached to the dock or pier. If the user so desires, the attachment device 10 can be further held in place or secured by a locking means such a padlock inserted through the padlock hole 36. Once the device 10 has been placed in the desired location upon the dock or pier, the attachment means 30 can then be connected to a tethering device such as a lead line from a boat or other watercraft.

When a user no longer wishes to maintain the boat latch 10 at a location, or wishes to leave and go to another location, the boat latch device 10 may be removed from the dock or pier. The boat latch 10 can be removed by raising the sliding sleeve 32 to a position where the sleeve 32 or the second crossbar 34 no longer contacts the spaced boards 100. The device 10 is then oriented so that the lengthwise portion of the first crossbar 16 is oriented parallel within the space between the spaced board members 100. From this location, the device 10 may be withdrawn from between the boards by lifting the device upwards.

As is shown in the aforementioned FIGS. 1–4, the present invention provides a temporary boat latch for use in a variety of locations and embodiments. Furthermore, this embodiment ensures that persons traveling in a means such as a boat have a sure way of connecting themselves to a mooring device or a launch site. This invention also enables a person to place and remove the device while only using one hand. This is an advantage to a person having a physical disability and allows for the device to be quickly attached or detached. This invention also enables boaters and other watercraft users to have a removable connection for attaching themselves to a dock or pier.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A removable securing device for use with a surface having spaced elements; said device configured for removable connection with said spaced elements, said securing device comprising:

an attachment means configured to connect said securing device to an object;

a first stop means connected to said attachment means, said first stop means configured to prevent removal of said securing device from between said spaced elements in a first direction;

a second stop means connected to said attachment means, said second stop means configured to prevent said securing device from being removed from between said spaced elements in a second direction said second stop means connected to an adjustable sliding sleeve, said adjustable sliding sleeve having a tapered Portion configured to allow the insertion of said adjustable sliding sleeve between said spaced elements.

2. The securing device of claim 1 wherein said first stop means has a length greater than the distance between said spaced elements and a width less than the distance between said spaced elements whereby said first stop means is brought into interaction with said spaced elements by being aligned lengthwise between said elements and then inserted between said elements, after said first stop means is inserted between said elements said first stop means is oriented that said stop means is aligned generally perpendicularly to said elements so as to prevent said device from being removed from between said elements in a first direction.

3. The device of claim 1 wherein said adjustable sliding sleeve is configured to releasably engage and retain said securing device in a desired location between said elements.

4. The securing device of claim 3 wherein said adjustable sliding sleeve is configured for use with one hand.

5. The securing device of claim 4 wherein said second stop means has a length greater than the distance between said elements.

6. The securing device of claim 5 wherein said second stop means is a crossbar positioned generally perpendicular to said attachment sleeve.

7. The securing device of claim 5 wherein said first stop means is connected to said attachment means by a connecting rod, said connecting rod having a generally straight portion connected to said first stop means, said connecting rod extending from said first stop means along an axis to a U-shaped rod portion.

8. The securing device of claim 7 wherein said connecting rod extends from said U-shaped rod portion to a first curved portion and from said first curved portion to a second curved portion.

9. The device of claim 8 wherein said sliding sleeve further comprises a means for attachment with a locking device.

10. The securing device of claim 7 wherein said sliding sleeve is configured to cover said connecting rod.

11. A securing device for use on a surface having spaced boards defining a space therebetween; said securing device comprising:

a generally elongated rod having a first end generally perpendicularly connected to a first crossbar, said first crossbar configured to have a length greater than the distance between said spaced boards and a thickness less than the distance between said spaced boards, said rod extending from said crossbar along a shaft to a U-shaped rod portion, said rod extending from said U-shaped rod portion to a first curved portion said first curved portion extending to a second curved portion, said second curved portion extending to a third curved portion, said third curved portion extending to a rod second end;

an attachment ring comprised of a generally oval shaped device circumvolving said rod and held within said U-shaped rod portion by said first and second curved port ions, said attachment ring configured ed for connection with a tethering connection means; and a slideable sleeve configured to receive said rod second end and said rod shaft in sliding engagement, said sleeve having a generally perpendicular second crossbar connected thereto; said second crossbar dimensioned so as to have a lesser length than said first crossbar, said slideable sleeve also having a tapered portion dimensioned to allow insertion of said device between said aced boards, said sleeve also comprising a portion adapted for connection with a locking means;

whereby when said first perpendicular crossbar is inserted between spaced boards and turned so that said crossbar cannot be withdrawn from between said boards, said elongated rod is raised so that said perpendicular crossbar is engaged against a bottom side of said boards, said sleeve is then lowered into said space between said boards, said second crossbar contacts said boards and prevents said securing device from failing through said space.

* * * * *